US006968274B2

(12) United States Patent
Tutuncu et al.

(10) Patent No.: US 6,968,274 B2
(45) Date of Patent: Nov. 22, 2005

(54) USE OF CUTTING VELOCITIES FOR REAL TIME PORE PRESSURE AND FRACTURE GRADIENT PREDICTION

(75) Inventors: Azra Nur Tutuncu, Houston, TX (US); Michael Tolbert Myers, Sugar Land, TX (US); Mohammad Michael Arasteh, Houston, TX (US)

(73) Assignee: Shell Oil Company, Houston, TX (US)

( * ) Notice: Subject to any disclaimer, the term of this patent is extended or adjusted under 35 U.S.C. 154(b) by 92 days.

(21) Appl. No.: 10/493,370

(22) PCT Filed: Oct. 24, 2002

(86) PCT No.: PCT/US02/34200

§ 371 (c)(1),
(2), (4) Date: Apr. 23, 2004

(87) PCT Pub. No.: WO03/036044

PCT Pub. Date: May 1, 2003

(65) Prior Publication Data

US 2004/0236513 A1 Nov. 25, 2004

Related U.S. Application Data

(60) Provisional application No. 60/336,348, filed on Oct. 24, 2001.

(51) Int. Cl.[7] ............................. G01V 1/40; G01N 3/00
(52) U.S. Cl. ...................... 702/11; 73/152.05; 73/866; 367/38; 702/14; 702/16
(58) Field of Search ........................ 702/6, 9, 11, 14, 702/16; 73/152.01, 152.03, 152.05, 152.11, 866; 175/39, 40; 367/38; 324/303, 376

(56) References Cited

U.S. PATENT DOCUMENTS

| 4,876,512 A | 10/1989 | Kroeger et al. ............. 324/376 |
| 4,981,037 A | 1/1991 | Holbrook et al. ............. 73/152 |
| 5,200,929 A | 4/1993 | Bowers ....................... 367/38 |
| 5,282,384 A | * 2/1994 | Holbrook ................. 73/152.05 |
| 5,285,692 A | 2/1994 | Steiger et al. ................ 73/866 |

OTHER PUBLICATIONS

Holbrook, P.W. et al: "A Petrophysical–Mechanical Math Model for Real–Time Wellsite Pore Pressure/Fracture Gradient Prediction", SPE Annual Tech Conf & Exhibition, No. 16666 Sep. 27, 1987 pp. 163–171

Nes,O.M. et al: "Rig–site and Laboratory Use of CWT Acoustic Velocity Measurements on Cuttings", SPE Annual Tech. Conf & Exhibition, No. 36854, Oct. 22–24, 1996, pp. 349–356.

* cited by examiner

Primary Examiner—Bryan Bui
Assistant Examiner—John Le

(57) ABSTRACT

Disclosed is a new method for providing accurate real time predictions of pore pressure and fracture gradient, at the rig site by determining the wave velocity from drill cuttings by a portable continuous wave technology (CWT) tool that measures drill cuttings at high resonant frequency and then using the velocity obtained in combination with the novel method of the present invention to arrive at accurate predictions for pore pressure and fracture gradient. The new technique offers real time pore pressure prediction at the rig site with small error margin that is not otherwise available using seismic, VSP, or check shot velocities in exploration.

13 Claims, 8 Drawing Sheets

USE OF CUTTING VELOCITIES FOR REAL TIME PORE PRESSURE AND FRACTURE GRADIENT PREDICTION

This application claims the benefit of Provisional Application No. 60/336,348, filed Oct. 24, 2001.

FIELD OF THE INVENTION

This invention generally relates to the analysis and interpretation of acoustic wave velocities in drill cutting samples. More particularly, this invention relates to a new method for providing very accurate real time predictions of pore pressure, fracture gradient, and formation strength at the rig site by determining the velocity of drill cuttings by means of a portable continuous wave technology (Hereafter referred to as CWT) tool that measures drill cuttings at high resonant frequency and using the velocity measurement obtained in combination with the method of the present invention to arrive at accurate predictions for pore pressure and fracture gradient. The new technique offers real time pore pressure prediction at the rig site with small error margin that is not otherwise available using seismic, vertical seismic profiling (VSP), or check shot velocities in exploration.

BACKGROUND OF THE INVENTION

The knowledge of accurate pore pressure, fracture gradient and formation strength is crucial while drilling a well for the success of the drilling operation. Pore pressure and fracture gradient are also controlling input parameters in borehole stability modeling, well planning, design, and wellpath optimization. While there are no commercially available tools for measurement of pore pressure ahead of the drilling bit, methodologies have been developed to calculate pore pressure in logged intervals using resistivity and/or sonic logs.

A few methods have been disclosed in the art for obtaining information regarding other properties while drilling. For example, a method has been disclosed to determine the porosity of a formation from drilling response. U.S. Pat. No. 4,064,749 discloses a method for determining porosity of a formation from drilling response, wherein a bit is attached to the lower end of a drill string that is rotated while the downward force on said bit is controlled. The method comprises the steps of measuring the revolutions of the bit, measuring the depth of the bit in the borehole, measuring the weight on said bit, determining the tooth dullness of said bit, measuring the torque applied to said drill string, determining a reference torque empirically, and determining said porosity by combining said measurements and determinations using an equation.

U.S. Pat. No. 4,949,575 discloses a technique for performing a formation analysis that utilizes drilling mechanics measurements as the porosity sensitive input. It comprises deriving a drilling signal indicative of the resistance of the formation to being drilled by a drill bit; deriving a plurality of additional signals indicative of formation properties; and, in response to said drilling signal and to said additional signals, deriving volumetric analysis of the subsurface formation.

U.S. Pat. No. 4,876,512 discloses a method for determining at well sites swelling-clay content of shales and shaly sandstones by conducting surface area measurements. The samples are washed with a fluid having a water activity substantially less than that of water that may contain a soluble cation, and measurements of the sample's dielectric constant are made at a pre-selected frequency (1 MHz) for subsequent comparison to calibration curves, thereby obtaining a measurement of the swelling clay content of the formation.

In U.S. Pat. No. 5,282,384, Holbrook discloses an improved technique based on sound mechanical theories from well logs for calculating the pressure of fluid contained in a sedimentary rock which has been naturally compacted under the influence of gravity. The effective stress portion of the method encompasses both internal and external measures of rock grain matrix strain. Thus the same effective stress calibration can be applied equally well to externally measured rock thickness data and petrophysically measured rock porosity data. The power law effective stress-strain relationship for any sedimentary rock can be determined from the weighted average of the power law functions of the minerals, which compose that sedimentary rock. In the present invention, Holbrook method has been modified both in methodology and in data type to predict pore pressure and fracture gradient.

A problem often encountered when drilling wells in many parts of the world is narrow drilling margins which require great precision in both pore pressure and fracture gradient prediction in order to prevent any shale instability problem resulting in risk of lost circulation and/or gas kicks/blowouts. For example, in the Gulf of Mexico deepwater environment the drilling margin may be less than ±0.5 ppg in both pore pressure and fracture gradient prediction. Therefore, the accuracy needed in wave velocities acquired from seismic, LWD and/or wireline logs is very important from the drilling aspect in addition to other known petrophysical and reservoir engineering applications of velocity.

Cuttings produced during drilling represent a potential quasi-real time source of information that can be procured at the rig site. The use of cuttings has been limited in the past partly due to the difficulties in performing measurements on very small samples.

In "Rig-site and Laboratory use of CWT Acoustic Velocity Measurements on Cuttings", by Nes, et al, Society of Petroleum Engineers Paper No. 36854, 1996, incorporated by reference herein in the entirety, there is presented the use of continuous wave technology (CWT) for measurement of acoustic phase velocities on cuttings using potentially portable equipment that is suitable for testing of small samples of cuttings, thus offering a new source of data that can be attained in quasi real-time at the rig site.

In order to calibrate seismic velocities, logging while drilling (LWD) and/or wireline sonic measurements, and, even more importantly, real time accurate formation wave velocity measurements, drill cuttings provide a potentially invaluable source of information.

There is a great need in the art for a method that makes it possible to accurately predict pore pressure and fracture gradient in real time measurements at the rig site. If such data were available it would also be useful for identifying high risk shallow water zones, optimizing mud weight, detecting shallow hazard zones, detecting abnormal pressure zones, determining formation strength for wellpath optimization and, in general, for obtaining the most trouble-free, cost effective drilling.

SUMMARY OF THE INVENTION

In accordance with the foregoing the present invention is a method for the prediction of pore pressure and fracture gradient in real time, at the rig site, by using resonant frequency continuous waveform (CWT) technology to obtain cutting velocity in real time and using the data in combination with the method disclosed in the present invention to accurately predict pore pressure and fracture gradient. The velocities can also be used in real time determination of formation mechanical properties and strength.

The invention comprises:
1. Obtaining a velocity measurement, $V_p$ of a cutting by:
   a) Preparing a sample with two opposite, parallel surfaces separated by a distance L;
   b) Placing sample between P- or S-wave transducers;
   c) Sweeping a sinusoidal signal continuously through a proper frequency range;
   d) Extracting and registering the envelope of the received amplitude modulated signal; and
   e) Measuring $\Delta f$, the linewidth at the halfpower point, for each amplitude peak, and inserting the number into the equation $V_p = 2 L \Delta f$;
2. Using the velocity measurement obtained to determine porosity from velocity by the Acoustic Formation Factor method using the equation:

$$\phi = 1 - \left(\frac{V_{pmeasured}}{V_{pmatrix}}\right)^\beta$$

where $\beta$ is 0.625 and $V_{pmatrix}$ is 18000 ft/sec for sand, respectively;
3. Predicting pore pressure from the recorded CWT velocity by:
   a. Calculating total vertical stress (overburden stress) using density integration:

$S_v = \int \rho(z) g dz$ where z is depth, $\rho(z)$ represents the formation bulk density as a function of depth, $\rho$ is density, and g is the gravitational constant;
   b. Obtaining effective vertical stress using Holbrook's correlation (Holbrook, 1996)

$\sigma_v = \sigma_{max}(1-\phi)^\alpha$ where $\sigma_{max}$ and $\alpha$ are lithology dependent constant parameters defined by Holbrook;
   c. Determining pore pressure using Terzaghi's law:

$P_p = (S_v - \sigma_v)/\gamma$ where $P_p$ is the pore pressure, $S_v$ is the total overburden stress calculated in step 3a, $\sigma_v$ is effective vertical stress calculated in step 3b, and $\gamma$=Biot coefficient=$1-(K_\beta/K_\gamma)$, with $K_\beta$ is bulk compressibility, and $K_\gamma$ is the grain compressibility; and
4. Predicting fracture gradient by Modified Holbrook method using CWT drill cutting velocity in the equation:

$S_{hmin} = \delta[P_p + \sigma_v(1-\phi)]$ where $S_{hmin}$ is minimum horizontal stress that is the lower limit of the fracture gradient, $\phi$ is porosity obtained in step 2, $P_p$ is pore pressure obtained in step 3(c), $\sigma_v$ is effective stress calculated in step 3(b), and $\delta$ is a local strength coefficient (use 0.85 as default if exploration area); or
5. Alternatively predicting fracture gradient by Modified Cam Clay method using drill cutting dielectric (DCM) measurements by:

a) Measuring the dielectric coefficient of the cutting;
   b) Calculating Surface Area (SA) from the DCM measurement using the equation:

$SA = 0.0274 * (DCM)^{1.9467}$ c) Defining a dimensionless coefficient M characterizing the mechanical strength of the formation using Surface Area obtained from DCM measurement in step 5(b) in the equation:

$$M = \frac{6\sin 10^A}{3 + \sin 10^A}$$

where $A = 1.54 - 1.36E-3 *$ SurfaceArea; and
   d) Obtaining a value for minimum horizontal stress using the equation:

$$S_{h\min} = \frac{3S_v - (S_v - 3M)P_p}{2M + 3}$$

DETAILED DESCRIPTION OF THE INVENTION

The novel method of the present invention offers a number of advantages over anything currently available in the art. First of all, it offers accurate real time prediction of pore pressure and fracture gradient using real formation sample measurements at the rig site. It can also provide a prediction of formation strength in wells with no sonic log, which enables operators to conduct a wellbore stability analysis and recommend optimum well pressures for successful drilling of the well by providing all input data necessary for wellbore stability analysis. These features provide potentially enormous savings in drilling costs associated with accurate wellpath optimization.

In addition, the measurements can be used to compare with later obtained LWD to analyze agreement, where differences may help determine risky zones in real time, mitigate problems, prevent borehole instability, and minimize lost production time.

Figure 1:
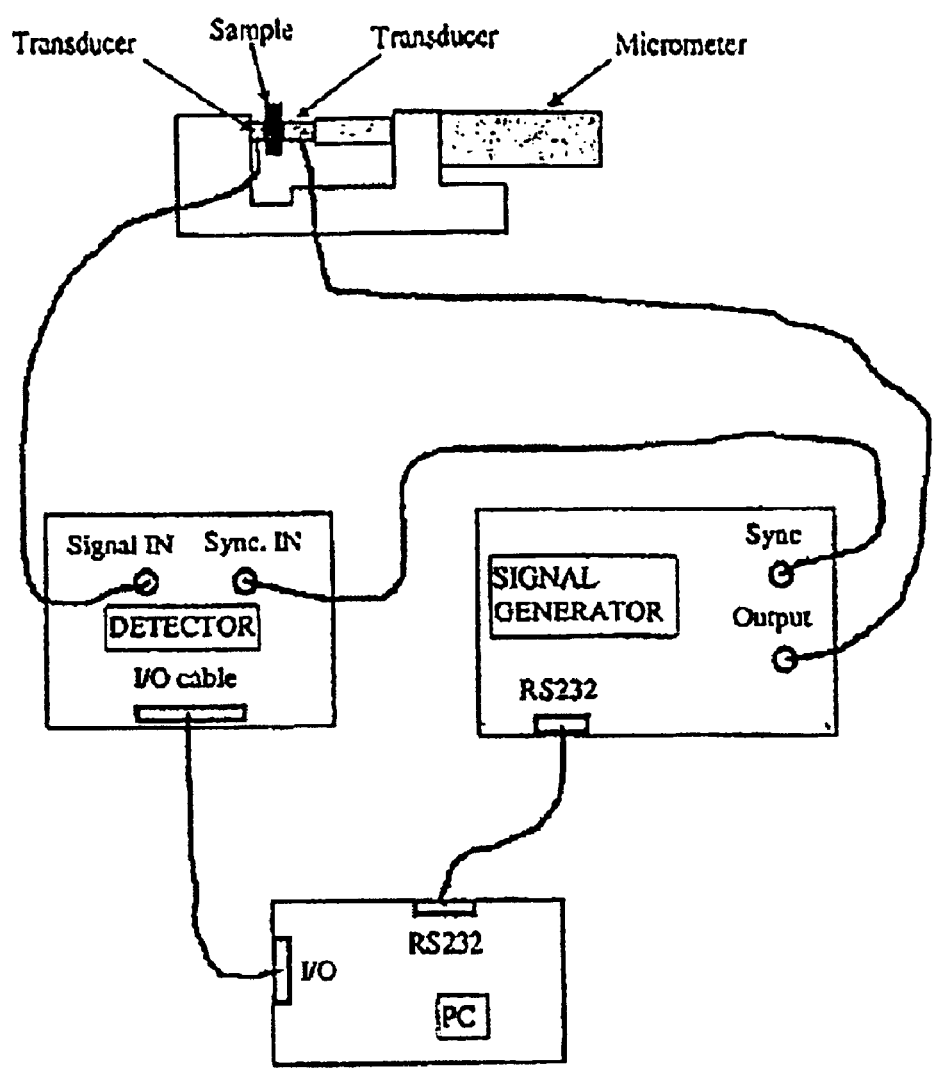
FIG. 1 is a diagram of the experimental set-up.
Figure 2:
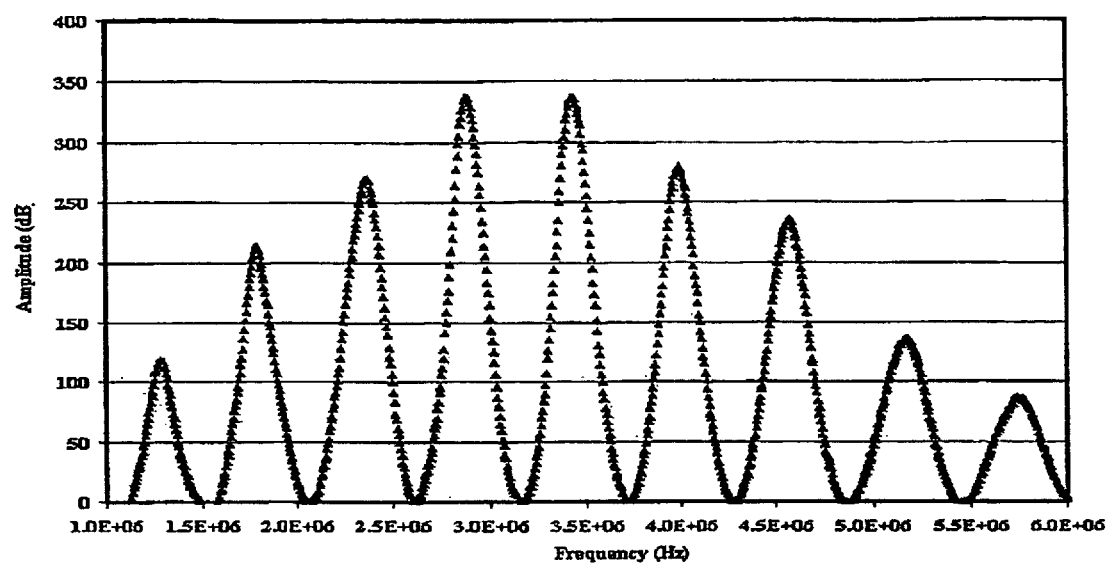
FIG. 2 is a CWT resonance spectrum for a 2.5 mm thick shale cutting.

The CWT instrument employed in the present invention to measure small samples of drill cuttings at the rig site is a portable apparatus consisting of a sample holder with two piezoelectric ultrasonic transducers positioned face-to-face. One transducer is used for acoustic wave generation, and the second transducer is used for detection. One of the transducers is mounted on the head of a micrometer that allows simultaneous measurement of the sample length. The sample is located between the two transducers. Ultrasonic, standing wave resonances are established in the composite resonator by sweeping the excitation frequency over a range corresponding to several standing wave resonances. The envelope of the received signal is amplified with help from a broadband detector with controllable gain that is connected to a laptop PC. Velocities are calculated in a computer software program when several input parameters are provided. An example of the measurement performed on a 2.5 mm thick (0.5 in) shale cutting sample is shown in FIG. 2. The portable CWT apparatus used in the present invention, shown in FIG. 1, is available commercially from TEMCO Company in Tulsa, Okla.

The following nomenclature is defined for reference in the description of the invention:

α=acoustic attenuation, Nepers/cm
CW=continuous wave
CWT=continuous wave technique
f=frequency, Hz, s$^{-1}$
D=diameter, m
L, z=sample thickness, m
λ=wavelength, m
mMD RT=measured depth rotary table, m
mTVD=true vertical depth, m
n=number of half-wavelengths, integer
$V_p$=velocity of sound, m/s, µs/ft
P=primary wave
S=shear/secondary wave
$\sigma_v$=vertical effective stress
φ=porosity
$\sigma_{max}$ and α=lithology dependent constant parameters
$S_v$=total overburden stress
ρ(z)=formation bulk density as a function of depth
z=depth
g=gravitational constant
d=density
$P_p$=predicted pore pressure
$\lambda P_p$=pore pressure where λ=Biot coefficient=1−($K_{62}$/$K_\gamma$), where $K_\beta$=bulk compressibility and $K_\gamma$=grain compressibility.
Subscripts:
n=number of half-wavelengths
p=primary The CWT apparatus relies on establishing ultrasonic, standing wave resonances in the composite resonator by sweeping the excitation frequency f over a range corresponding to several standing wave resonances. The resonances are then contained in the amplitude-modulated signal received with the second transducer, as shown, in FIG. 2. Each of the standing wave resonances, n, is characterized by a resonant frequency $f_n$. Plane waves are generally assumed, in practice, meaning that λ/D is sufficiently small, where λ is the acoustic wavelength and D the diameter. Resonance will occur essentially each time λ=v/f fulfills L=n·λ/2, where L is the sample thickness, i.e. the distance between the two transducer faces, and n is an integer. The acoustic phase velocity, whether P- or S-wave, can now be expressed as $V_p$=2 L Δf. Here, Δf≡$f_{n+1}$−$f_n$ is the difference in frequency between two consecutive resonances. For example, a shale with $V_p$ of 6550 ft/s and L=0.06 inch would display Δf≈0.67 MHz, and the practical frequency would be in the range of 1–10 MHz.

In preparation for obtaining a measurement the operator prepares a sample drill cutting with two opposite, parallel surfaces separated by a distance L (distance L representing the length of the sample cutting), attaches P- or S-wave transducers to each of the two surfaces, sweeps a sinusoidal signal continuously through a proper frequency range, extracts and registers the envelope of the received amplitude modulated signal; measures Δf, and inserts the numbers into the equation $V_p$=2 L Δf.

Preparation of the sample comprises obtaining two smooth and parallel surfaces and can be accomplished using abrasive sand paper. The selection of drill cuttings must be done carefully to reduce possible errors from depth uncertainties, heterogeneities, and mechanical damage of cuttings and/or cavings. It is possible to prepare and measure samples, including finely grained samples with thicknesses in fraction of inches, in approximately less than 10 minutes after cutting is captured at the shale shaker.

The sample is clamped between the two transducers while measurements are conducted. A micrometer is attached to the metal frame and is used to position the transducer, thus permitting the length of the sample to be measured under the load of the measurement. In order to assure sufficient signal quality without affecting sample properties, a properly selected acoustic coupling gel is used on both prepared sample surfaces.

Required frequency sweeps are provided by a frequency generator. The envelope of the received signal is amplified by a broadband detector with controllable gain that is connected to a laptop PC. Velocities are calculated by a computer program when several input parameters are provided.

The method of the present invention provides accurate real time data from sub-inch samples. However, it was observed that, although there were not significant variations in accuracy, samples of 2.5 mm to about 3 mm afforded the most accurate data. Samples smaller than 2.5 mm or samples that were thicker than 4–5 mm sometimes resulted in misleading data.

After obtaining values for velocity of properly prepared samples within the preferred length each velocity data point is converted to predicted pore pressure using the Modified Holbrook Method.

The Modified Holbrook Method is one of the most reliable methods to apply for prediction of pore pressure. The Holbrook method stands out in its independence from the shale point selection that most other techniques require. Lithological variations are accommodated explicitly in pore pressure prediction using this method. Modified Holbrook Method rests on three basic equations. The first equation is the definition of vertical effective stress, i.e., Terzaghi's effective stress law:

$$\sigma_v = S_v - \lambda P_p \Leftrightarrow P_p = (S_v - \sigma_v)/\lambda \tag{1}$$

where $S_v$ is the total overburden stress, $P_p$ is the pore pressure, and λ=Biot coefficient=1−($K_\beta$/$K_\gamma$), with $K_\beta$ is bulk compressibility and $K_\gamma$ is the grain compressibility. $S_v$ is generally obtained by integration of the density log that constitutes the second equation.

$$S_v = \int \rho(z) g dz \quad (2)$$

The third equation, is an empirical equation, deduced from an extensive set of well log data and formation pressure measurements. This equation relates the effective stress to formation porosity by $$\sigma_v = \sigma_{max}(1-\phi)^\alpha \quad (3)$$

where $\sigma_{max}$ and $\alpha$ are lithology dependent constant parameters (Holbrook, 1996).
Equation (3) requires porosity as input. Porosity can be either measured directly in the laboratory using core samples, or can be obtained from various logs (resistivity, conductivity or sonic), seismic or laboratory measured core or, as reported in this invention, from cutting velocities.

Velocity derived porosity is preferred to minimize effects of temperature and salinity variations on measured log data. Moreover, small variations in porosity associated with abnormally pressured formations are reflected in acoustic responses to large magnification. Using CWT technique, velocities obtained from the measurements can be used to obtain porosity and bulk compressibility.

Porosity can be determined from velocity by the Acoustic Formation Factor using the equation:

$$\phi = 1 - \left(\frac{V_{pmeasured}}{V_{pmatrix}}\right)^\beta \quad (4)$$

where $\beta$ is 0.625 and $V_{pmatrix}$ is 18000 ft/sec for sand, respectively.

Once porosity is known, Equation (3) is used to obtain vertical effective stress $\sigma_v$. Once vertical effective stress is known, Equation (1) is used to predict pore pressure.

In the second embodiment of the invention fracture gradient can be predicted by two different calculations. In the first one fracture gradient is predicted by the Modified Holbrook method using the CWT drill cutting velocity in the equation:

$$S_{hmin} = \delta[P_p + \sigma_v(1-\phi)]$$

where $S_{hmin}$ is minimum horizontal stress that is the lower limit of the fracture gradient, $\phi$ is porosity, $P_p$ is pore pressure, $\sigma_v$ is effective stress, calculations of which are discussed above, and $\delta$ is a local strength coefficient (use 0.85 as default if exploration area).

Alternatively fracture gradient can be predicted by the Modified Cam Clay method using drill cutting dielectric (DCM) measurements by:
a) Measuring the dielectric coefficient measurement of the cutting;
b) Calculating Surface Area (SA) from the DCM measurement using the equation:

$$SA = 0.0274 * (DCM)^{1.9467}$$

b) Defining a dimensionless coefficient M characterizing the mechanical strength of the formation using Surface Area obtained from DCM measurement in the equation:

$$M = \frac{6\sin 10^A}{3 + \sin 10^A}$$

where A=1.54=1.36E-3 * SurfaceArea
d) Obtaining a value for minimum horizontal stress using the equation:

$$S_{hmin} = \frac{3S_v - (S_v - 3M)P_p}{2M + 3}$$

Figure 7:
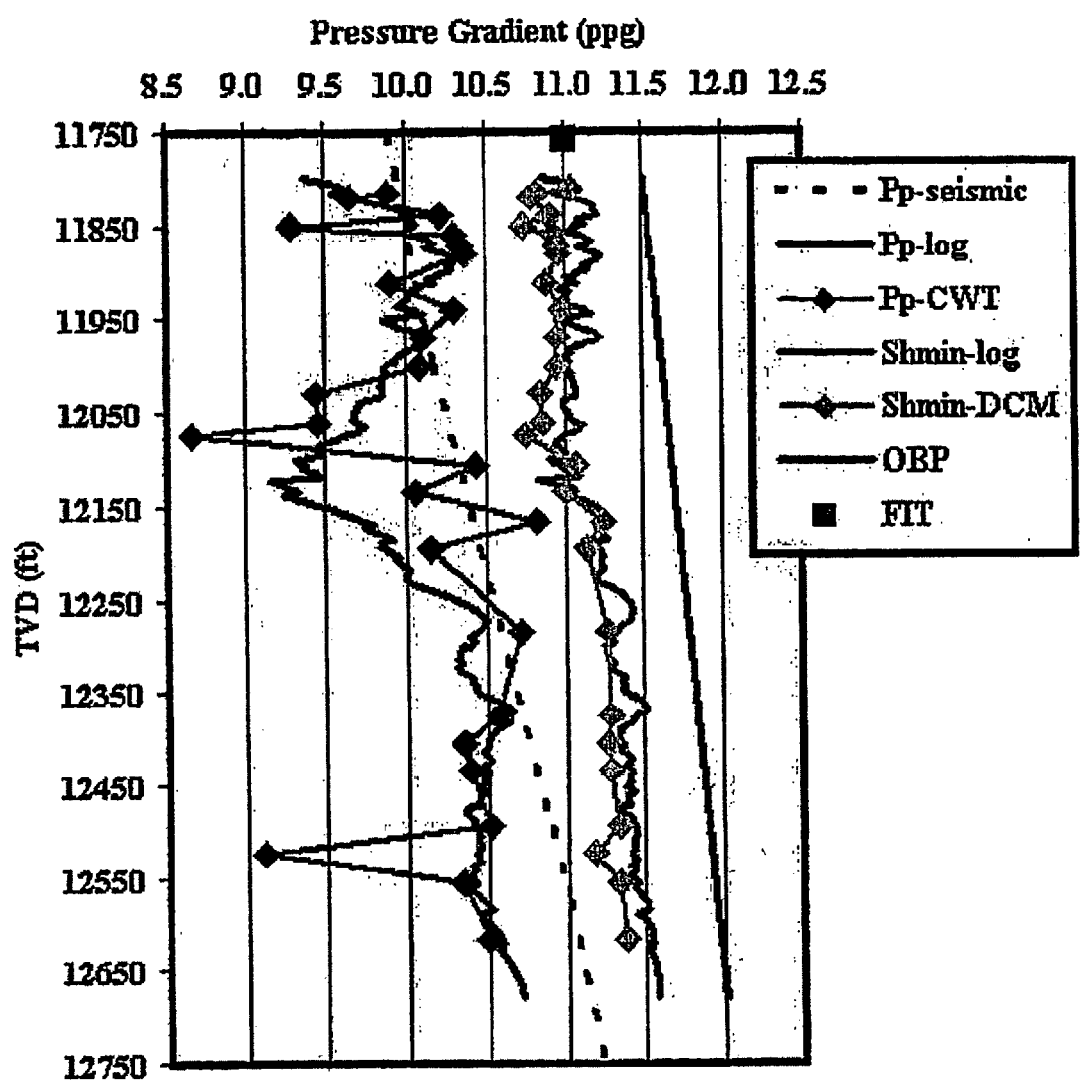
FIG. 7 discloses predicted pore pressure and fracture gradient as a function of depth at a Gulf of Mexico well after the interval is drilled and wireline sonic data were collected. CWT and DCM derived predictions made in real time while drilling in the same interval are included for comparison.
Figure 8:
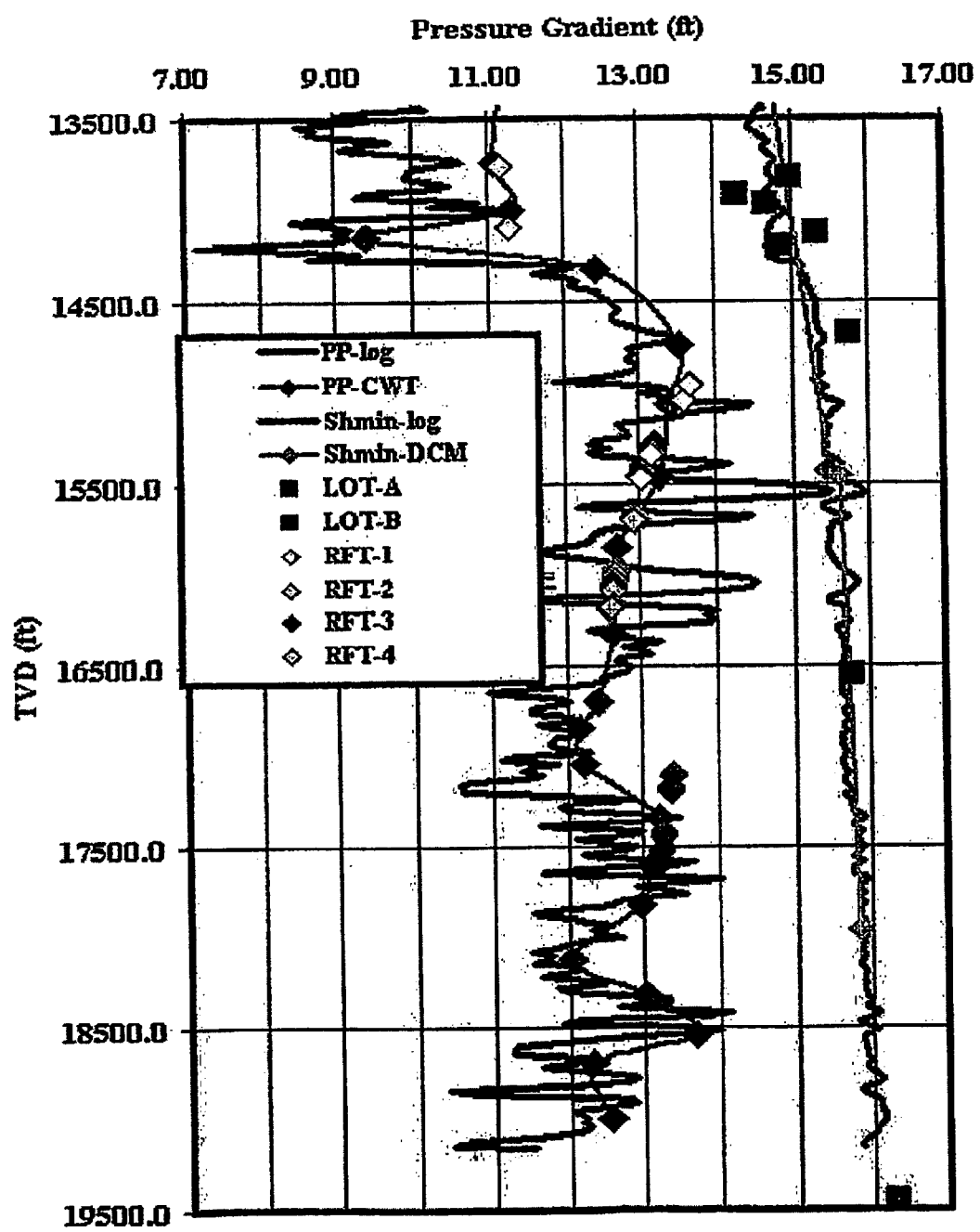
FIG. 8 discloses predicted pore pressure and fracture gradient as a function of depth at another Gulf of Mexico well using CWT and DCM data.

After the predicted pore pressure and fracture gradient has been calculated, the values can be plotted as a function of depth. This is discussed further in Examples 2 and 3 and FIGS. 5, 7, and 8.

In the present invention we have combined the CWT method for measuring velocities with new methods we have discovered for obtaining accurate predictions of pore pressure and fracture gradient from compressional wave velocity. The method of the present invention can be utilized to revise pore pressure prediction from seismic velocities in exploration areas and can be used for calibration of seismic data prior to availability of sonic logs. The present invention will also potentially have a powerful impact on detection of the weak zones that are prone to ballooning and lost circulation along with other borehole stability problems such as, for example, stuck pipe and bit balling.

The method of the present invention, incorporating the CWT tool, is portable, relatively inexpensive, and easy to operate. Using equipment that can be carried in a briefcase to the rig, velocities can be obtained within minutes and converted to values for the prediction of pore pressure and fracture gradient using sub-inch scale samples. Our experience in an exploration well in real time rig operation with CWT tool indicated significant deviation from seismic interval velocities, however there was much better agreement with wireline sonic when at a later stage wireline sonic data was collected.

When employing the invention in the field it was observed that, although in most cases depth was accurate to about ±30 ft., cuttings can be collected at more frequent intervals, say, within ±10 ft. to increase accuracy. Also, the measurements are performed under uniaxial stress conditions, rather than triaxial, however it was found, particularly with shale, that the minor discrepancy between results obtained at uniaxial versus triaxial did not result in a significant variation from the results under actual pressure.

The following examples will serve to illustrate the invention disclosed herein. The examples are intended only as a means of illustration and should not be construed as limiting the scope of the invention in any way. Those skilled in the art will recognize many variations that may be made without departing from the spirit of the disclosed invention.

EXPERIMENTAL

EXAMPLE I

Figure 3:
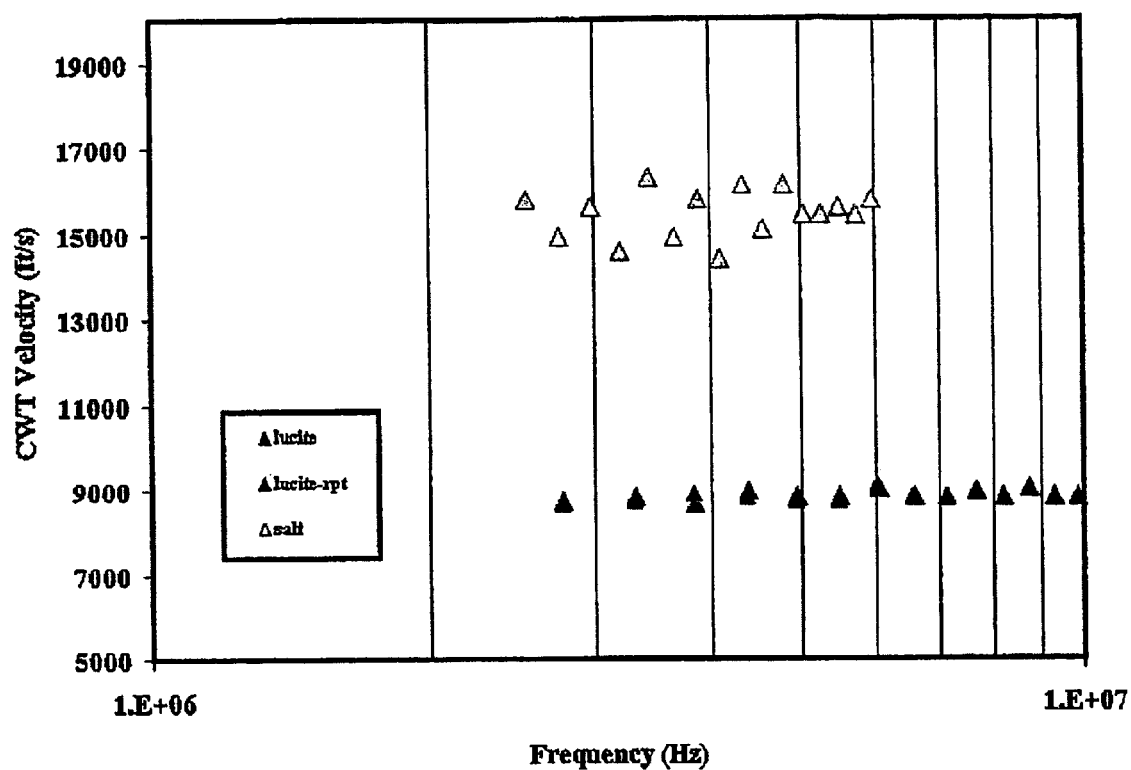
FIG. 3 is a graph showing CWT velocities versus frequency for reference materials Lucite and salt.

Reference materials were tested in the laboratory and at the rig site to verify the accuracy of the velocity measurement methodology (CWT) that is the source of the input data for the methodology discussed in this invention. Results of some reference experiments are shown in FIG. 3. The salt sample used in the measurement had an impurity in it. Therefore, two different $\Delta f$ values were obtained corresponding to the pure halite and impurity, respectively. Resulting CWT velocity versus frequency indicates two different velocities based on the two different $\Delta f$ values.

EXAMPLE II

Figure 4:
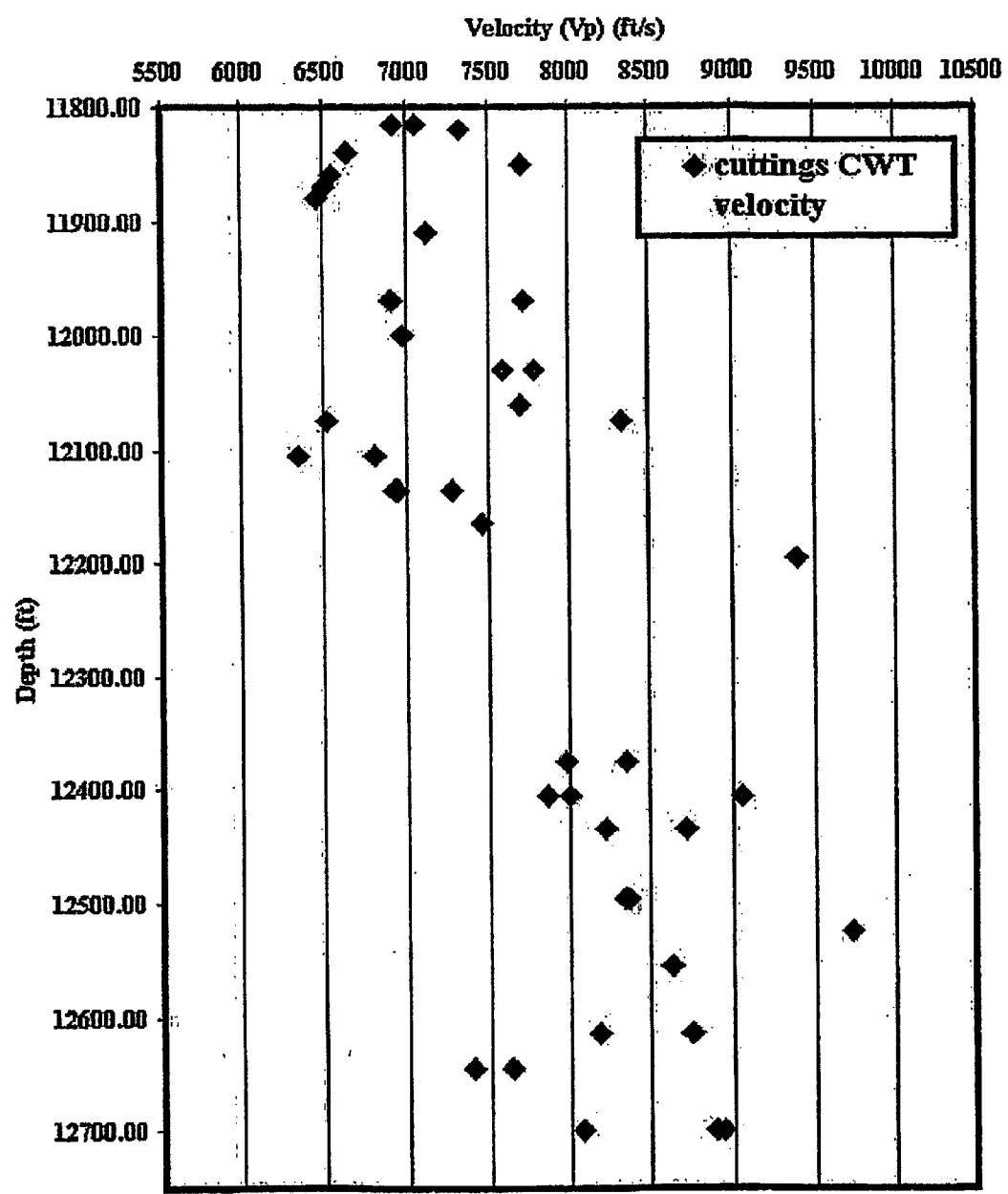
FIG. 4 is a graph showing CWT velocities collected in real time versus depth at a well in Gulf of Mexico.
Figure 5:
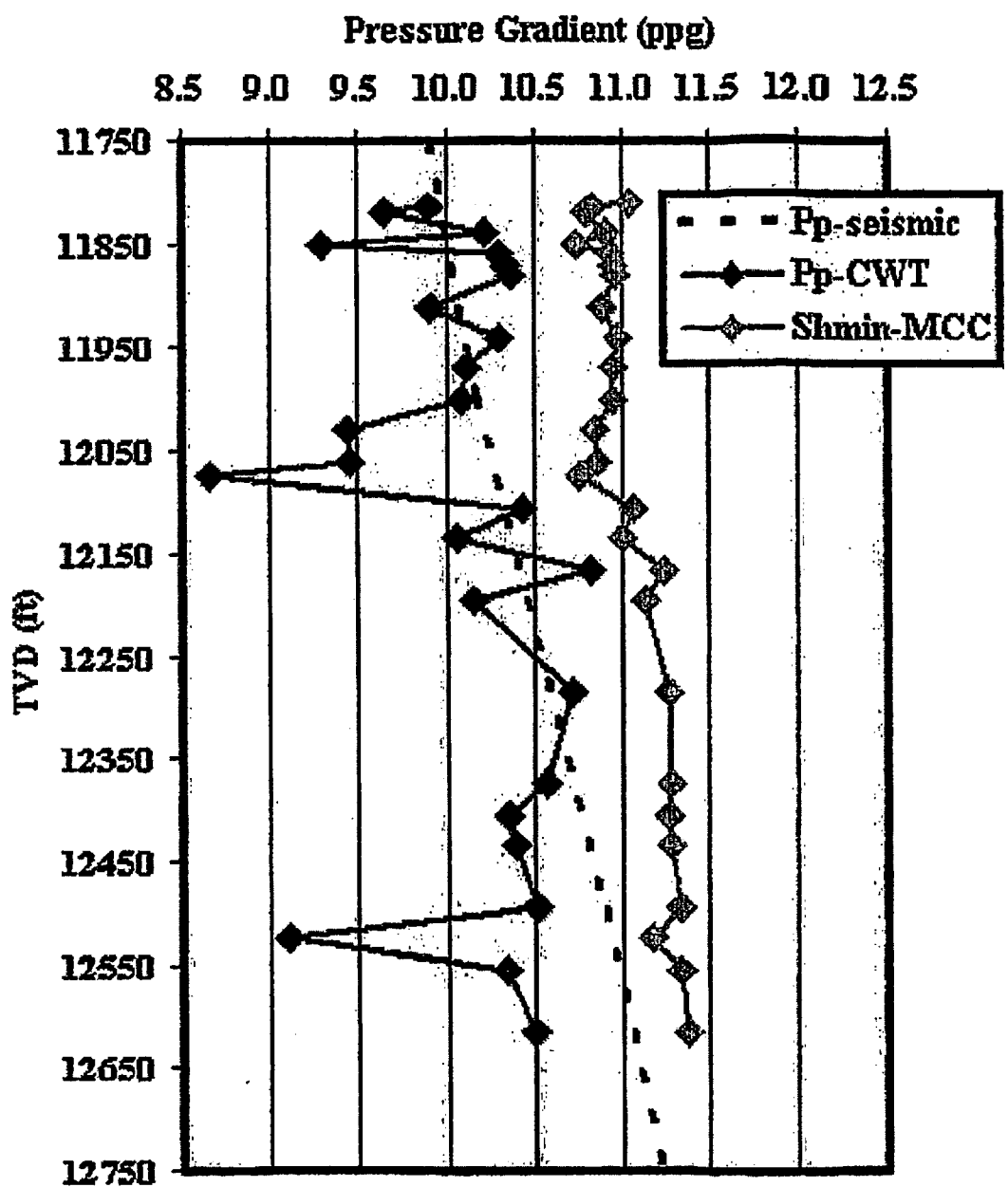
FIG. 5 demonstrates real time predicted pore pressure and fracture gradient using cutting, CWT and DCM data as a function of depth for a selected interval of a Gulf of Mexico well.
Figure 6:
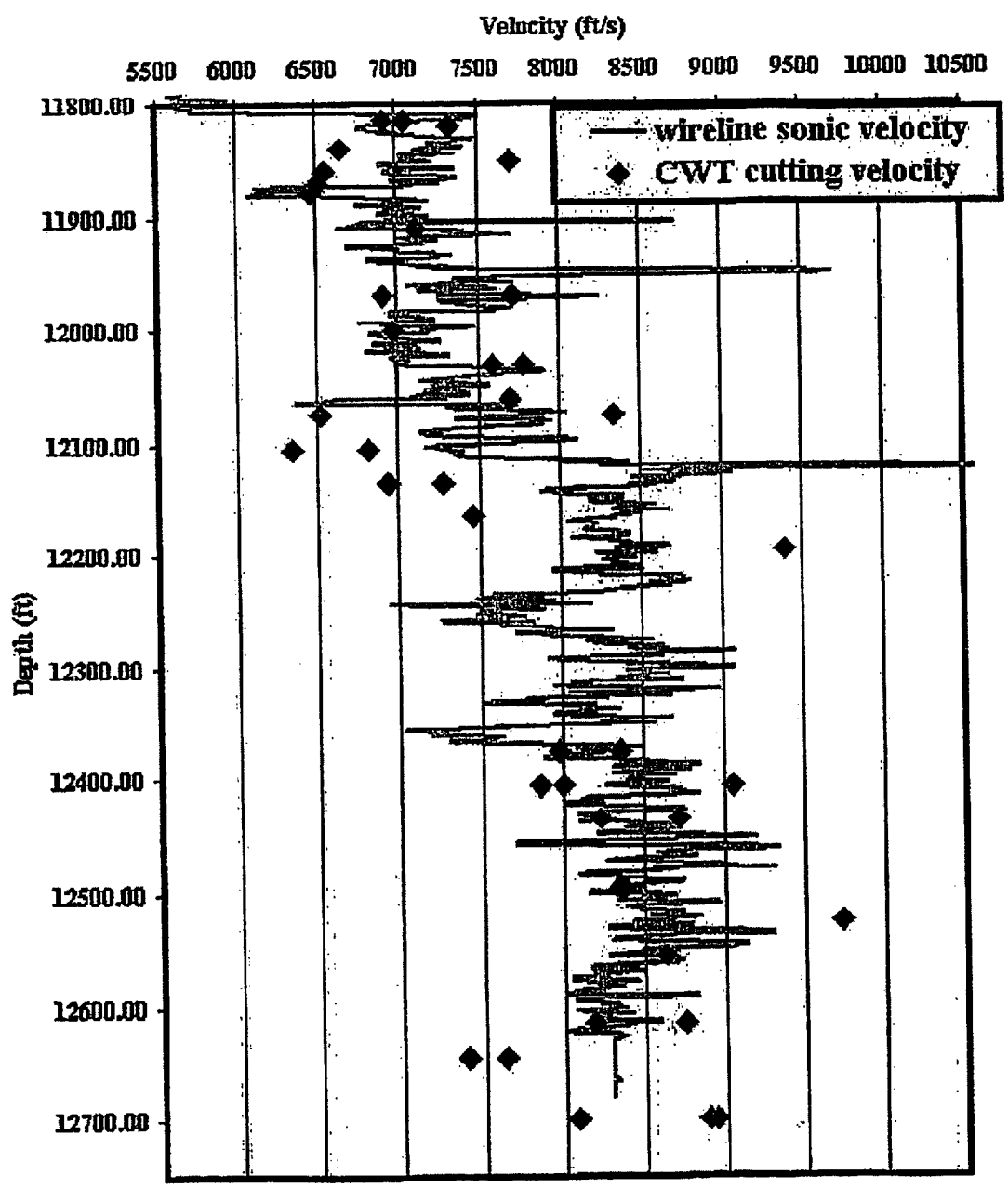
FIG. 6 presents CWT and wireline sonic velocities versus depth for selected interval of a Gulf of Mexico well.

The tool was field tried at a Gulf of Mexico rig site and real time CWT measurements were conducted at a specific hole interval. During the drilling, sonic LWD was not run due to large hole size. Therefore, CWT velocities provided the only real time source while drilling for calibration of the pore pressure predicted from seismic data before drilling. The recorded velocity versus depth from the selected interval is shown in FIG. 4. Corresponding pore pressure and fracture gradient obtained from the CWT velocities presented in FIG. 4 and from the dielectric coefficient measurements using drill cuttings are shown in FIG. 5. After the interval was drilled, wireline sonic data was collected. A comparison of the wireline velocities and CWT velocities are presented in FIG. 6. The resulting pore pressure and fracture gradient comparison between seismic, wireline sonic, CWT velocities and DCM derived fracture gradient are summarized in FIG. 7. It is evident from FIG. 7 that the CWT and DCM derived pore pressure and fracture gradient prediction in real time using drill cuttings is accurate and provides valuable information for validation of the casing seat depth, mud weight, wellbore stability analysis and other drilling activities for trouble free drilling.

EXAMPLE III

Cuttings from another Gulf of Mexico well have been used to predict pore pressure and fracture gradient using CWT velocities and DCM measurements. Predicted pore pressure and fracture gradient obtained from the velocities and DCM are presented in FIG. 8 along with log-derived pore pressure and fracture gradient profiles, and the RFT (actual fluid pressure data measured from repeated formation tests) and LOT data (leak off test data conducted at various casing shoe depths at nearby wells in the field) already available. The agreement from CWT predicted pore pressure and RFT data are excellent.

While the illustrative embodiments of the invention have been described with particularity, it will be understood that various other modifications will be readily apparent to, and can be easily made one skilled in the art without departing from the spirit of the invention. Accordingly, it is not intended that the scope of the following claims be limited to the examples and descriptions set forth herein but rather that the claim be construed as encompassing all features which would be treated as equivalents thereof by those skilled in the art to which this invention pertains.

We claim:

1. A method for predicting fracture gradient from cuttings while drilling which comprises:

Obtaining a velocity measurement, $V_p$, of a cutting by:
 a) Preparing a sample with two opposite, parallel surfaces separated by a distance L;
 b) Placing sample between P- or S-wave transducers;
 c) Sweeping a sinusoidal signal continuously through a proper frequency range;
 d) Extracting and registering the envelope of the received amplitude modulated signal; and
 e) Measuring $\Delta f$, the difference in frequency between two consecutive resonances, for each amplitude peak, and inserting $\Delta f$ into the equation $V_p = 2L\Delta f$;
 f) Using the velocity measurement obtained to determine porosity from velocity by the Acoustic Formation Factor method using the equation:

$$\phi = 1 - (V_{pmeasured}/V_{pmatrix})^\beta$$

where $\beta$ is 0.625 an $V_{pmatrix}$ is 18000 ft/sec for sand, respectively;

Predicting pore pressure from the recorded CWT velocity by:
 g) Calculating total vertical stress (overburden stress) using density integration:

$$S_v = \int \rho(z) g \, dz$$

where z is depth, $\rho(z)$ represents the formation bulk density as a function of depth, d is density, and g is the gravitational constant;
 h) Obtaining effective vertical stress using the Holbrook correlation $$\sigma_v = \sigma_{max}(1-\phi)^\alpha$$

where $\sigma_{max}$ and $\alpha$ are lithology dependent constant parameters defined by Holbrook;
 i) Determining pore pressure using Terzaghi's law:

$$P_p = (S_v - \sigma_v)/\gamma$$

where $P_p$ is the pore pressure, $S_v$ is the total overburden stress calculated in step g, $\sigma_v$ is effective vertical stress calculated in step h, and
$\gamma =$ Biot coefficient $= 1 - (K_\beta/K_\gamma)$, with $K_\beta$ is bulk compressibility, and $K_\gamma$ is the grain compressibility; and Predicting fracture gradient by a modified Holbrook method using CWT drill cutting velocity in the equation:

$$S_{hmin} = \delta[P_p + \sigma_v(1-\phi)]$$

where $S_{hmin}$ is minimum horizontal stress that is the lower limit of the fracture gradient, $\phi$ is porosity obtained in step f, $P_p$ is pore pressure obtained in step i, $\sigma_v$ is effective Stress calculated in step h, and $\delta$ is a local strength coefficient.

2. The method of claim 1 further comprising the predicted fracture gradient is plotted as a function of depth.

3. The method of claim 1 further comprising the frequency and amplitude of the cuttings are measured using a continuous wave tool comprising a portable apparatus consisting of a sample hold with two piezoelectric ultrasonic transducers positioned face to face, wherein one transducer is used for acoustic wave generation and a second transducer is used for detection.

4. The method of claim 1 further comprising the cuttings are collected at intervals that provide accuracy of ±5 to 50 ft (±1.524 to 15.24 m).

5. The method claim 4 wherein the cuttings are collected at intervals that provide accuracy of ±30 ft(±9.144 m).

6. The method of claim 1, wherein the length of sample L is between about 1.5 and 4 mm.

7. The method of claim 1, wherein the cuttings are saturated.

8. The method of claim 1, further comprising the calculations are in the form of a computer program.

9. A method for predicting fracture gradient in real time while drilling using sub-inch cuttings which comprises:

Obtaining a velocity measurement, $V_p$ of a cutting by:
 a) Preparing a sample with two opposite, parallel surfaces separated by a distance L;
 b) Placing sample between P- or S-wave transducers;
 c) Sweeping a sinusoidal signal continuously through a proper frequency range;
 d) Extracting and registering the envelope of the received amplitude modulated signal; and
 e) Measuring $\Delta f$, the difference in frequency between two consecutive resonances, for each amplitude peak, and inserting $\Delta f$ into the equation $V_p = 2L\Delta f$;
 f) Using the velocity measurement obtained to determine porosity from velocity by the Acoustic Formation Factor method using the equation:

$$\phi = 1 - (V_{pmeasured}/V_{pmatrix})^\beta$$

where $\beta$ is 0.625 an $V_{pmatrix}$ is 18000 ft/sec for sand, respectively;

Predicting pore pressure from the recorded CWT velocity by:

g) Calculating total vertical stress (overburden stress) using density integration:

$$S_v = \int \rho(z) g\, dz$$

where z is depth, $\rho(z)$ represents the formation bulk density as a function of depth, d is density, and g is the gravitational constant;

h) Obtaining effect ye vertical stress using Holbrook correlation:

$$\sigma_v = \sigma_{max}(1-\phi)^\alpha$$

where $\sigma_{max}$ and $\alpha$ lithology dependent constant parameters defined by Holbrook;

i) Determining pore pressure using Terzaghi's law:

$$P_p = (S_v - \sigma_v)/\gamma$$

where $P_p$ is the pore pressure, $S_v$ is the total overburden stress calculated in step g, $\sigma_v$ is effective vertical stress calculated in step h, and $\gamma$=Biot coefficient=$1-(K_\beta/K_\gamma)$, with $K_\beta$ is bulk compressibility, and $K_\gamma$ is the grain compressibility;

Predicting fracture gradient by Modified Cam Clay method using drill cutting dielectric (DCM) measurements by:

j) Measuring the dielectric coefficient measurement of the cutting;

k) Calculating Surface Area (SA) from the DCM measurement using the equation:

$$SA = 0274 * (DCM)^{1.9457};$$

l) Defining a dimensionless coefficient M characterizing the mechanical strength of the formation using Surface Area obtained from DCM measurement in step k in the equation:

$$M = 6 \sin 10^A / (3 + \sin 10^A)$$

where A=1.54−1.36E−3*SurfaceArea; and m) Obtaining a value for minimum horizontal stress using the equation:

$$S_{hmin} = 3S_v - (S_v - 3M)P_p/(2M+3).$$

10. The method of claim 9, further comprising the cuttings are collected at intervals that provide accuracy of ±5 to 50 ft (±1.524 to 15.24 m).

11. The method of claim 9, wherein the length of sample L is between about 1.5 and 4 mm.

12. The method of claim 9, wherein the cuttings are saturated.

13. The method of claim 9, further comprising the calculations are in the form of a computer program.

* * * * *